US011226539B2

(12) United States Patent
Jun

(10) Patent No.: US 11,226,539 B2
(45) Date of Patent: Jan. 18, 2022

(54) APERTURE MODULE AND CAMERA MODULE INCLUDING THE SAME

(71) Applicant: Samsung Electro-Mechanics Co., Ltd., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/811,275

(22) Filed: Mar. 6, 2020

(65) Prior Publication Data

US 2020/0409234 A1 Dec. 31, 2020

(30) Foreign Application Priority Data

Jun. 28, 2019 (KR) .................. 10-2019-0078010

(51) Int. Cl.
G03B 9/06 (2021.01)
G02B 26/02 (2006.01)

(52) U.S. Cl.
CPC .............. G03B 9/06 (2013.01); G02B 26/02 (2013.01)

(58) Field of Classification Search
CPC .................................. G03B 9/06; G02B 26/02
USPC ........................................................ 396/510
See application file for complete search history.

(56) References Cited

U.S. PATENT DOCUMENTS

| 4,319,822 A * | 3/1982 | Tezuka ..................... G03B 9/62 |
| | | 396/464 |
| 7,350,990 B2 * | 4/2008 | Shin ......................... G03B 9/10 |
| | | 396/463 |
| 7,472,998 B2 | 1/2009 | Sasazaki et al. |
| 7,907,321 B2 * | 3/2011 | Mizumaki ............... G03B 9/06 |
| | | 359/234 |
| 8,405,894 B2 * | 3/2013 | Saito .................. G02B 27/0018 |
| | | 359/227 |
| 9,152,013 B2 * | 10/2015 | Yoshizawa ............... G03B 9/06 |
| 10,564,516 B2 * | 2/2020 | Lee .......................... G03B 9/06 |
| 10,721,417 B2 * | 7/2020 | Ha ........................ H04N 5/2357 |
| 10,969,653 B2 * | 4/2021 | Kim ........................ G03B 9/06 |
| 2012/0076486 A1 | 3/2012 | Bai et al. |
| 2018/0164537 A1 | 6/2018 | Lee |
| 2019/0346749 A1 * | 11/2019 | Seo ....................... G03B 17/565 |
| 2020/0278590 A1 * | 9/2020 | Nakada .................. G02B 7/021 |

FOREIGN PATENT DOCUMENTS

| JP | 2005-18020 A | 1/2005 |
| JP | 2008-203576 A | 9/2008 |
| JP | 6426436 B2 | 11/2018 |
| KR | 10-2009-0048841 A | 5/2009 |

(Continued)

OTHER PUBLICATIONS

Korean Office Action dated Aug. 27, 2020 in counterpart Korean Patent Application No. 10-2019-0078010 (8 pages in English and 6 pages in Korean).

Primary Examiner — Christopher E Mahoney

(74) Attorney, Agent, or Firm — NSIP Law

(57) ABSTRACT

An aperture module includes a rotary plate disposed on a base, an aperture driving unit driving the rotary plate to rotate, and a plurality of blades interlocked with rotation of the rotary plate, and forming an entrance hole having various sizes by combinations thereof, wherein the plurality of blades each have a portion forming the entrance hole in a stepped form.

22 Claims, 11 Drawing Sheets

(56) References Cited

FOREIGN PATENT DOCUMENTS

| KR | 10-2012-0032433 | A | 4/2012 |
| KR | 10-1477247 | B1 | 12/2014 |
| KR | 10-2018-0065687 | A | 6/2018 |

* cited by examiner

APERTURE MODULE AND CAMERA MODULE INCLUDING THE SAME

CROSS-REFERENCE TO RELATED APPLICATIONS

This application claims the benefit under 35 U.S.C. 119(a) of Korean Patent Application No. 10-2019-0078010 filed on Jun. 28, 2019, in the Korean Intellectual Property Office, the entire disclosure of which is incorporated herein by reference for all purposes.

BACKGROUND

1. Field

The present disclosure relates to an aperture module and a camera module including an aperture module.

2. Description of the Background

Recently, camera modules have been generally installed in portable electronic devices such as tablet personal computers (PCs), laptop computers, and the like, in addition to smartphones. In a digital camera, in order to change an amount of incident light, depending on the image-capturing environment, a mechanical aperture may be provided. However, in the case of a camera module used in a small product such as a portable electronic device, it may be difficult to provide an aperture separately due to structural features and spatial limitations.

As an example, due to various components for driving an aperture, the weight of a camera module may become heavy, so the autofocus adjustment (Autofocus) or hand-shake compensation (Optical Image Stabilization) may be degraded. Moreover, when a power connection unit such as a coil for driving an aperture is provided in an aperture itself, the power connection unit may be locked due to vertical movement of a lens during autofocusing adjustment. Moreover, a function for precisely controlling an entrance hole of an aperture module to have various sizes while reducing the usage of a current may be useful.

Furthermore, in order to implement a shape similar to a circular shape while varying a size of an entrance hole of an aperture, a plurality of blades may be used, and thus, a problem may occur, in which a thickness of an aperture module may be increased.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a rotary plate disposed on a base, an aperture driving unit driving the rotary plate to rotate, and a plurality of blades interlocked with rotation of the rotary plate, and forming an entrance hole having various sizes by combinations thereof, wherein the plurality of blades each include a portion forming the entrance hole in a stepped form.

The plurality of blades may overlap each other in a same position in a direction of an optical axis.

The plurality of blades may be stepped in two stages.

The plurality of blades may each be stepped by a blade thickness in a direction of an optical axis.

The two stages may include an upper blade and a lower blade, and the upper blade of each blade may be disposed to overlap an upper portion of the lower blade in an optical axis direction of an adjacent blade of the plurality of blades.

A boundary between the upper blade and the lower blade may include a bent portion.

The entrance hole may have a polygonal shape, and each of the plurality of blades may provide two sides in which both sides form the entrance hole based on the bent portion.

The plurality of blades may include a stepped portion in a boundary between the two stages, and the stepped portion may be caught by an adjacent blade of the plurality of blades to serve as a stopper.

The entrance hole may be a regular polygon.

Each of the plurality of blades may provide two sides to the entrance hole in the form of a regular polygon.

A through-hole of the base may be exposed to form a largest entrance hole when the plurality of blades are extended outwardly.

The plurality of blades may have the same shape.

A size of the entrance hole may be changed continuously.

The plurality of blades may each have a blade thickness and may be disposed to overlap each other to be implemented to have a thickness twice the blade thickness.

In another general aspect, a camera module includes an aperture module disposed on a lens module, and forming an entrance hole having various sizes using a plurality of blades, and an aperture driving unit configured to move by connecting a moving portion, including a driving magnet opposing a driving coil, to the plurality of blades, wherein the plurality of blades are disposed in a same position in an optical axis direction.

The plurality of blades may be stepped in two stages and each blade may be disposed to overlap an adjacent blade.

In another general aspect, an aperture module includes a rotary plate disposed on a base, an aperture driving unit driving rotation of the rotary plate, and three or more blades connected to the base and the rotary plate to increase and decrease an entrance hole size in response to the rotation, wherein each of the three or more blades includes a portion forming the entrance hole, wherein the three or more blades each include an upper blade and a lower blade stepped from the upper blade, wherein the upper blade of each blade overlaps in an optical axis direction an upper surface of a lower blade of an adjacent blade of the three or more blades.

The three or more blades may each be disposed on the base and the rotary plate on a same plane perpendicular to the optical axis.

The three or more blades may overlap in the optical axis direction to a height substantially the same as a height from a lower surface of the lower blade to an upper surface of the upper blade of the three or more blades.

The three or more blades may each be stepped by a blade thickness in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
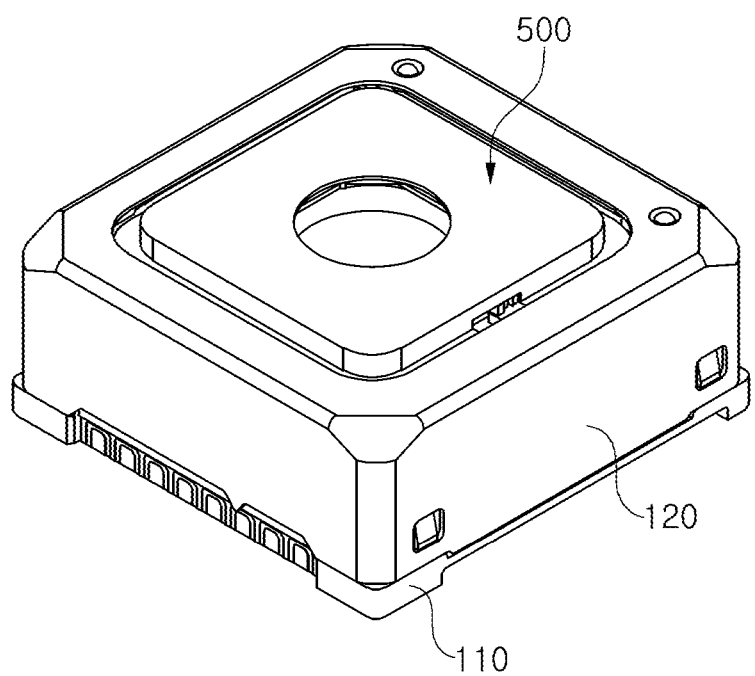
FIG. 1 is a perspective view of one or more examples of a camera module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide an aperture module capable of implementing a diameter of an aperture successively and accurately, while reducing the use of current.

Moreover, in an embodiment of the present disclosure, while a plurality of blades are used to form an entrance hole having a shape similar to a circular shape, a thickness of an aperture module may not be increased.

A camera module according to an embodiment of the present disclosure may be mounted on a portable electronic device, such as a mobile communications terminal, a smartphone, or a tablet PC.

Figure 2:
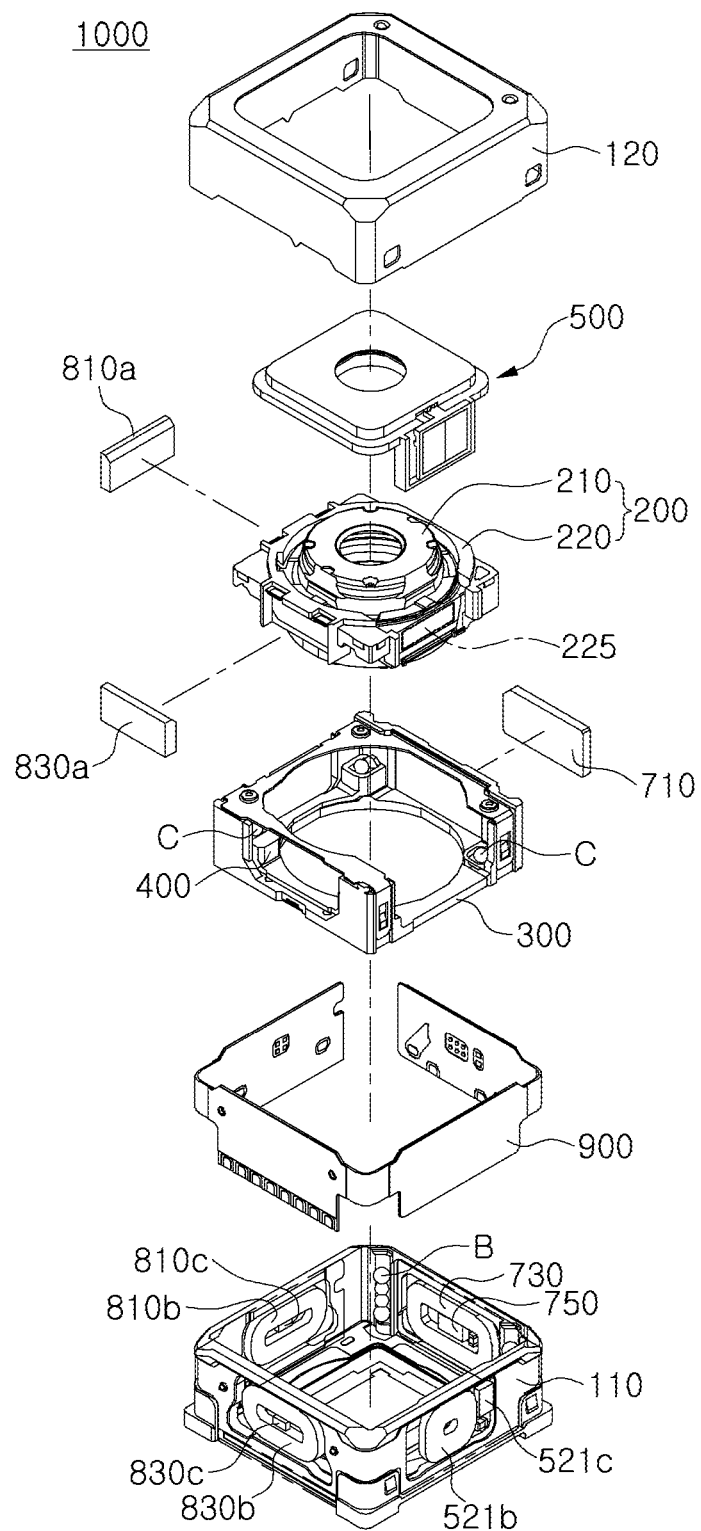
FIG. 2 is an exploded perspective view of one or more examples of a camera module according to an embodiment of the present disclosure.
Figure 3A:
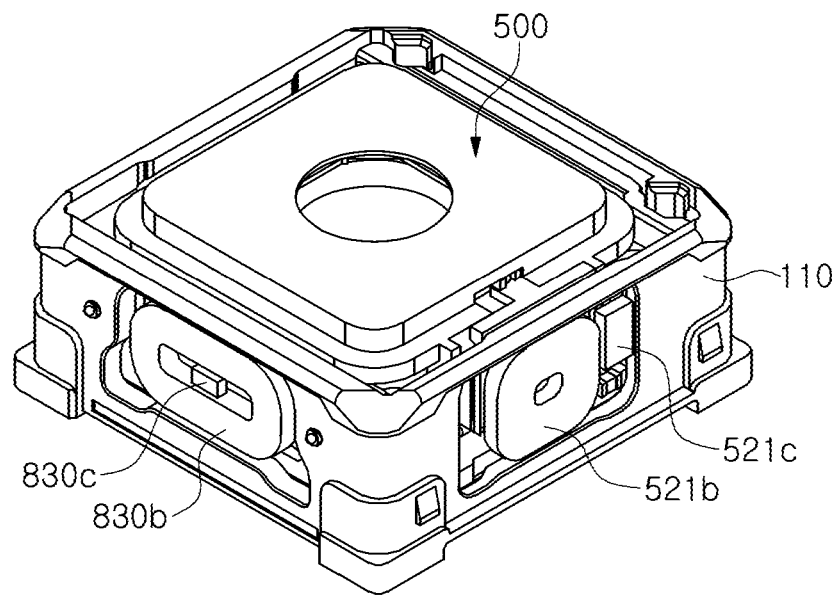
FIG. 3A is a perspective view of one or more examples of a portion of a camera module according to an embodiment of the present disclosure.
Figure 3B:
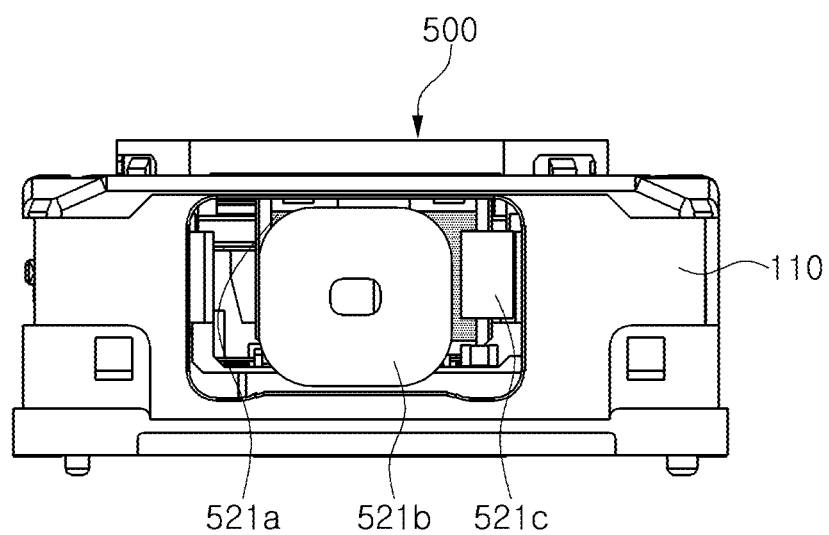
FIG. 3B is a side view of FIG. 3A.

FIG. 1 is a perspective view of one or more examples of a camera module according to an embodiment of the present disclosure, and FIG. 2 is an exploded perspective view of one or more examples of a camera module according to an embodiment of the present disclosure. Moreover, FIG. 3A is a perspective view of one or more examples of a portion of a camera module according to an embodiment in the present disclosure, and FIG. 3B is a side view of FIG. 3A.

Referring to FIGS. 1 to 3B, a camera module 1000 according to an embodiment of the present disclosure may include a lens module 200, a carrier 300, a guide portion 400, an aperture module 500, a housing 110, and a case 120.

The lens module 200 may include a lens barrel 210 having a plurality of lenses capturing an image of a subject and a holder 220 accommodating the lens barrel 210. The plurality of lenses are disposed inside the lens barrel 210 along an optical axis. The lens module 200 may be accommodated in the carrier 300.

The lens module 200 may be configured to be moved in an optical axis direction for focus adjustment. As an example, due to a focus adjusting unit, the lens module 200 may be moved in an optical axis direction together with the carrier 300.

The focus adjusting unit may include a magnet 710 and a coil 730, generating driving force in the optical axis direction. Moreover, a position sensor 750, for example, a hall sensor may be provided to sense a position of the lens module 200, that is, the carrier 300 in the optical axis direction.

The magnet 710 may be mounted on the carrier 300. As an example, the magnet 710 may be mounted on one side of the carrier 300.

The coil 730, which may also be referred to herein as an autofocus (AF) driving coil, and the position sensor 750 may be mounted in the housing 110. As an example, the coil 730 and the position sensor 750 may be fixed to the housing 110 to oppose the magnet 710. The coil 730 and the position sensor 750 may be provided on a substrate 900, and the substrate 900 may be mounted in the housing 110.

The magnet 710 is provided as a moving member mounted on the carrier 300 to move in the optical axis direction together with the carrier 300, while the coil 730 and the position sensor 750 are provided as a fixed member fixed to the housing 110.

When power is applied to the coil 730, the carrier 300 may be moved in the optical axis direction due to electromagnetic influence between the magnet 710 and the coil 730. Moreover, the position sensor 750 may sense a position of the carrier 300 in the optical axis direction.

Since the lens module 200 is accommodated in the carrier 300, the lens module 200 is also moved together with the carrier 300 in the optical axis direction due to movement of the carrier 300.

Moreover, the aperture module 500, mounted on an upper portion of the lens module 200, may also be moved together with the lens module 200 in the optical axis direction.

When the carrier 300 is moved, in order to reduce friction between the carrier 300 and the housing 110, a rolling member B between the carrier 300 and the housing 110. The rolling member B may have a ball shape.

The rolling member B may be disposed on both sides of the magnet 710 (or the coil 730).

A yoke may be mounted on the substrate 900. As an example, the yoke may be disposed to oppose the magnet 710 with the coil 730 interposed therebetween.

Attractive force may be applied in a direction perpendicular to the optical axis direction between the yoke and the magnet 710.

Thus, due to the attractive force between the yoke and the magnet 710, a state in which the rolling member B is in contact with the carrier 300 and the housing 110 may be maintained.

Moreover, the yoke may function to focus magnetic force of the magnet 710. Accordingly, magnetic flux leakage may be prevented.

As an example, the yoke and the magnet 710 may form a magnetic circuit.

Moreover, in order to compensate for shaking of an image caused by a factor such as hand-shake of the user, the lens module 200 may be moved in a first direction perpendicular to an optical axis, and a second direction perpendicular to the optical axis and the first direction.

For example, a shaking compensating unit may compensate shaking by applying relative displacement, corresponding to the shaking, to the lens module 200, when an image is captured and shaking occurs due to hand-shake of the user.

The guide portion 400 may be accommodated in the carrier 300 to be placed in an upper portion in the optical axis direction. In addition, a holder 220 may be placed in an upper portion of the guide portion 400. In addition, a ball member C, serving as a rolling bearing, may be provided between the carrier 300 and the guide portion 400 in the optical axis direction and between the guide portion 400 and the holder 220 in the optical axis direction.

When the lens module 200 is moved in a first direction and a second direction, perpendicular to an optical axis, the guide portion 400 is configured to guide the lens module 200.

As an example, the lens module 200 moves relative to the guide portion 400 in a first direction, while the guide portion 400 and the lens module 200 may be configured to move in the carrier 300 in a second direction.

A shaking compensating unit may include a plurality of magnets 810a and 830a as well as a plurality of coils 810b and 830b, which may also be referred to herein as a first optical image stabilization (OIS) driving coil and a second OIS driving coil, for generation of driving force for shaking compensation. In addition, in order to sense a position of the lens module 200 in the first direction and the second direction, a plurality of position sensors 810c and 830c, for example, hall sensors, may be provided.

Among the plurality of magnets 810a and 830a and the plurality of coils 810b and 830b, a portion of the plurality of magnets, a magnet 810a and a portion of the plurality of coils, a coil 810b are disposed to oppose in a first direction to generate driving force in the first direction, and the rest of the plurality of magnets, a magnet 830a and the rest of the plurality of coils, a coil 830b are disposed to oppose in a second direction to generate driving force in the second direction.

The plurality of magnets 810a and 830a are mounted on the lens module 200, and the plurality of coils 810b and 830b and the plurality of position sensors 810c and 830c, opposing the plurality of magnets 810a and 830a, are fixed to the housing 110. As an example, the plurality of coils 810b and 830b as well as the plurality of position sensors 810c and 830c are provided in the substrate 900, and the substrate 900 is mounted on the housing 110.

The plurality of magnets 810a and 830a are provided as a moving member moving in a first direction and a second direction together with the lens module 200, while the plurality of coils 810b and 830b and the plurality of position sensors 810c and 830c are provided as a fixed member fixed to the housing 110.

Moreover, in an embodiment of the present disclosure, a ball member C supporting the guide portion 400 and the lens module 200 is provided. The ball member C serves to guide the guide portion 400 and the lens module 200 in a shaking compensation process.

The ball member C may be provided between the carrier 300 and the guide portion 400, between the carrier 300 and the lens module 200, and between the guide portion 400 and the lens module 200.

When driving force is generated in a first direction, the ball member C, disposed between the carrier 300 and the guide portion 400, and between the carrier 300 and the lens module 200, may be rolled in the first direction. Accordingly, the ball member C may guide movement of the guide portion 400 and the lens module 200 in the first direction.

In addition, when driving force is generated in a second direction, the ball member C, disposed between the guide portion 400 and the lens module 200, and between the carrier 300 and the lens module 200, may be rolled in the second direction. Accordingly, the ball member C may guide movement of the lens module 200 in the second direction.

The lens module 200 and the carrier 300 may be accommodated in the housing 110. As an example, the housing 110 has an approximately rectangular box shape having an open upper portion and an open lower portion, and the lens module 200 and the carrier 300 are accommodated in an inner space of the housing 110.

A printed circuit board with an image sensor mounted thereon may be disposed in a lower portion of the housing 110.

The case 120 may be coupled to the housing 110 to surround an outer surface of the housing 110, and may function to protect internal components of the camera module. Moreover, the case 120 may function to block electromagnetic waves.

As an example, the case 120 may block electromagnetic waves in order to prevent the electromagnetic waves, generated by a camera module, from affecting other electronic components in a portable electronic device.

Moreover, since various electronic components other than a camera module are mounted on a portable electronic device, the case 120 may block electromagnetic waves in order to prevent the electromagnetic waves, generated by the electronic components, from affecting the camera module.

The case 120 is formed of a metallic material to be grounded to a ground pad provided in a printed circuit board, and thus blocks electromagnetic waves.

The aperture module 500 is a device configured to selectively change an amount of incident light incident on the lens module 200.

As an example, the aperture module 500 may successively implement incidence holes having different sizes with a plurality of blades. Depending on the image-capturing environment, light may be incident through one of incident holes having various sizes.

Figure 4:
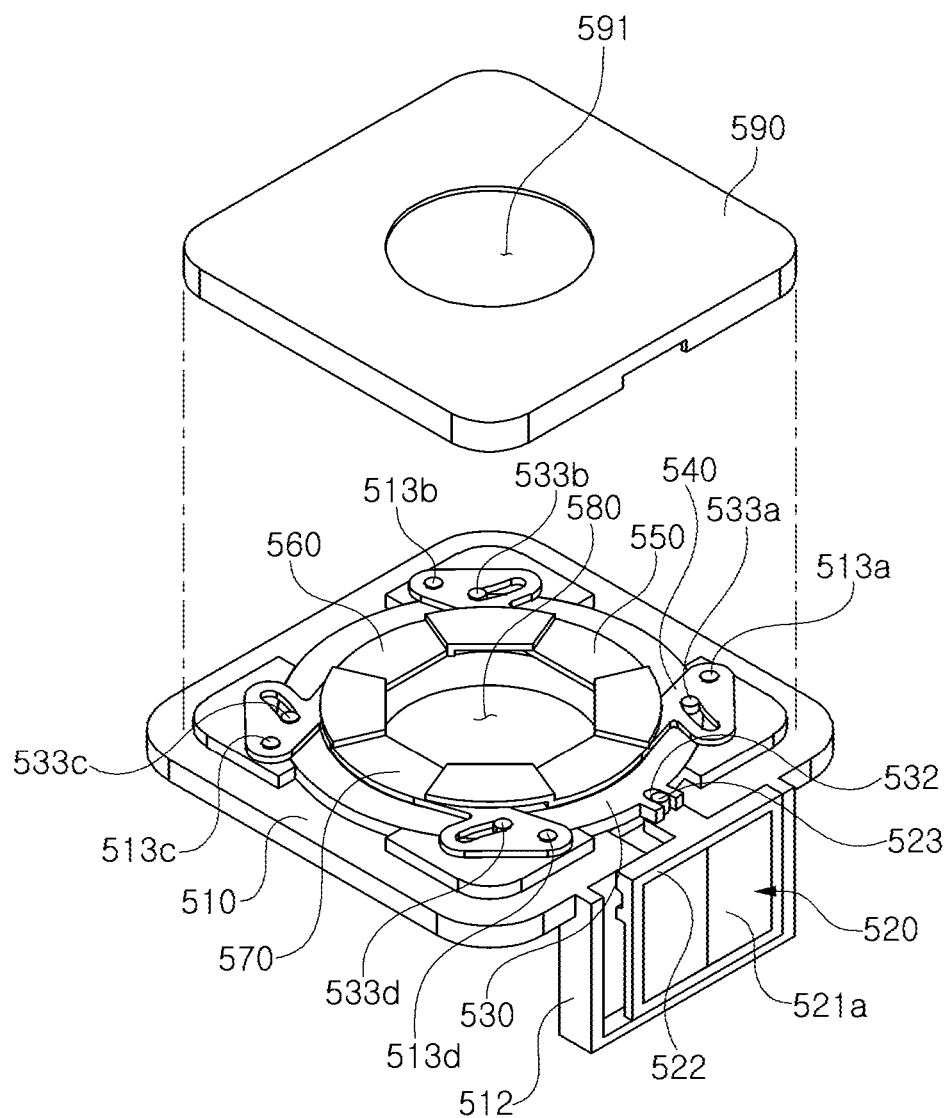
FIG. 4 is a combined perspective view of one or more examples of an aperture module according to an embodiment of the present disclosure in which a cover of the aperture is separated.
Figure 5:
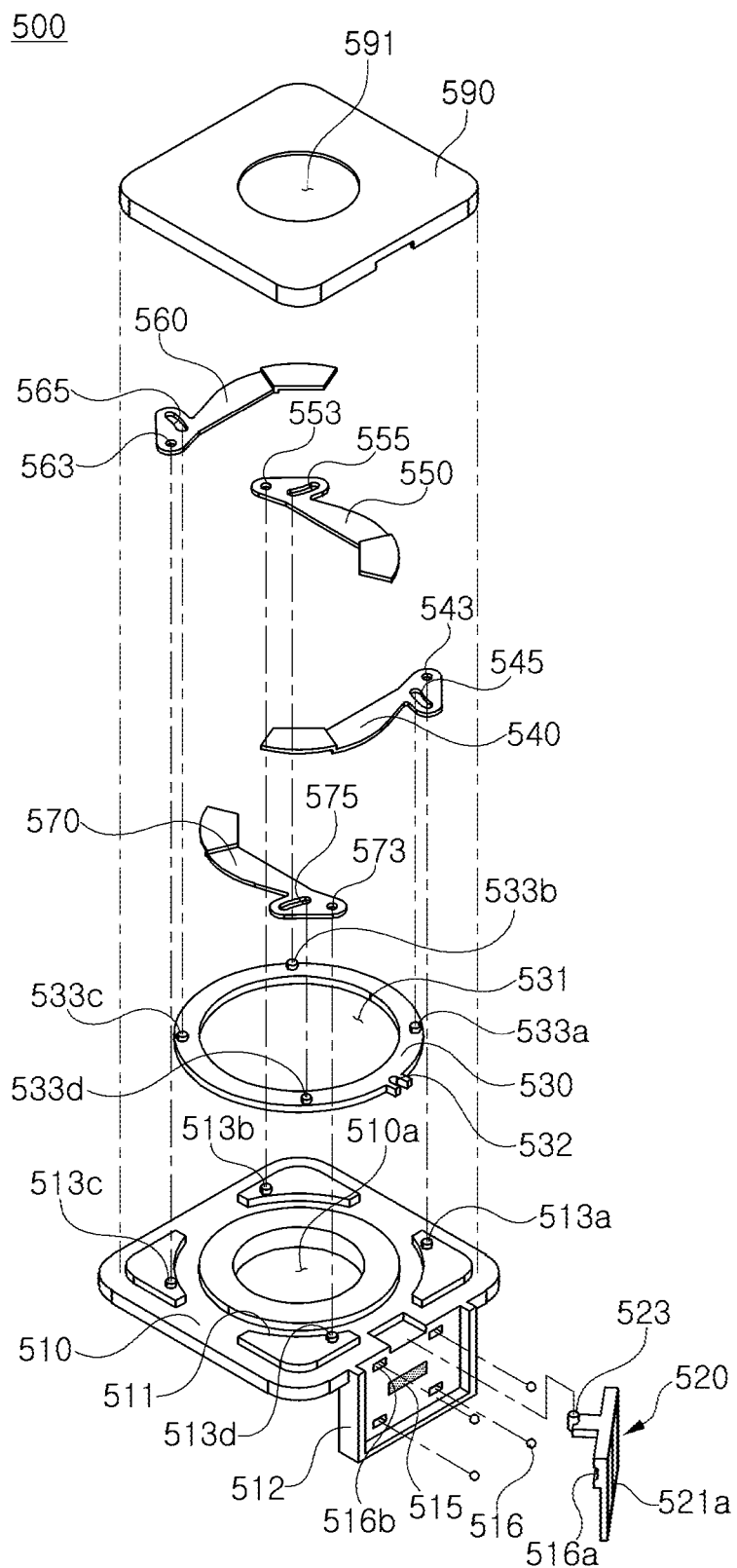
FIG. 5 is an exploded perspective view of one or more examples of an aperture module according to an embodiment of the present disclosure.

FIG. 4 is a combined perspective view of one or more examples of an aperture module according to an embodiment of the present disclosure in which a cover of the aperture is separated, and FIG. 5 is an exploded perspective view of one or more examples of an aperture module according to an embodiment of the present disclosure.

The aperture module 500 is coupled to the lens module 200, and is configured to selectively change an incident amount of light incident on the lens module 200.

A relatively small amount of light may be incident on the lens module 200 in a high illumination environment, while and a relatively large amount of light may be incident on the lens module 200 in a low illumination environment. Thus, image quality may be maintained constant even under various illumination conditions.

The aperture module 500 is configured to be coupled to the lens module 200 and moved in the optical axis direction, the first direction, and the second direction together with the lens module 200. That is, the lens module 200 and the aperture module 500 move together during the focus adjustment and the shaking compensation so that a distance between the lens module and the aperture module is not changed.

Referring to FIGS. 4 and 5, an aperture module 500 includes a base 510, a plurality of blades 540, 550, 560, and 570, and an aperture driving unit. The aperture driving unit includes a moving portion 520 including a driving magnet 521a and a driving coil 521b. Moreover, the aperture module may include a position sensor, for example, a hall sensor, 521c, to precisely identify a position of the moving portion 520 and enable closed-loop control. Moreover, the aperture module may include a cover 590 covering the base 510 and the plurality of blades 540, 550, 560, and 570, and having a through-hole 591 through which light is incident.

The aperture module 500 according to an embodiment includes, for example, a plurality of blades 540, 550, 560, and 570. Moreover, as illustrated in the drawings, the aperture module may have a structure including four blades, but an embodiment is not limited thereto. Alternatively, the illustrated embodiments as described herein may be applied to cases in which three or more blades are included in the aperture module 500.

Figure 10A:
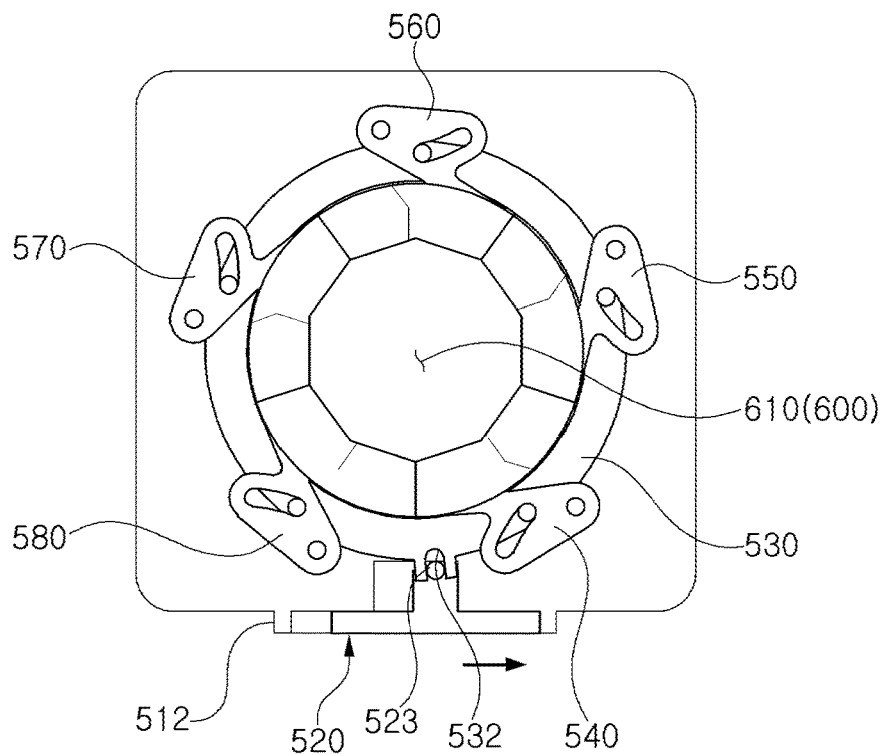
FIGS. 10A, 10B, and 10C are plan views illustrating one or more examples of an aperture module driven for a change in a size of an entrance hole of an aperture module according to another embodiment of the present disclosure.
Figure 10B:
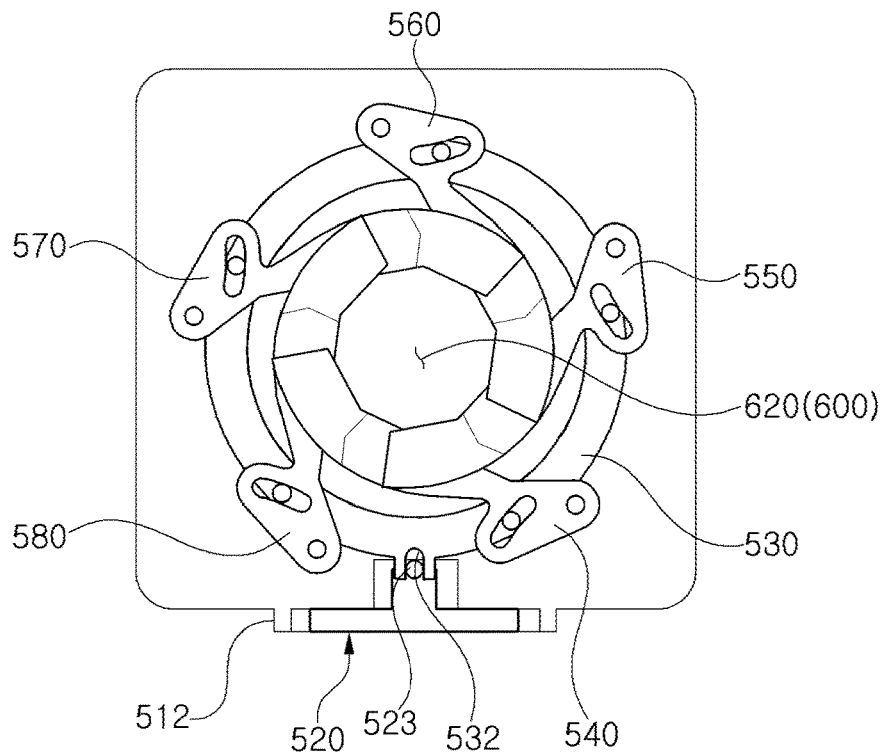
Figure 10C:
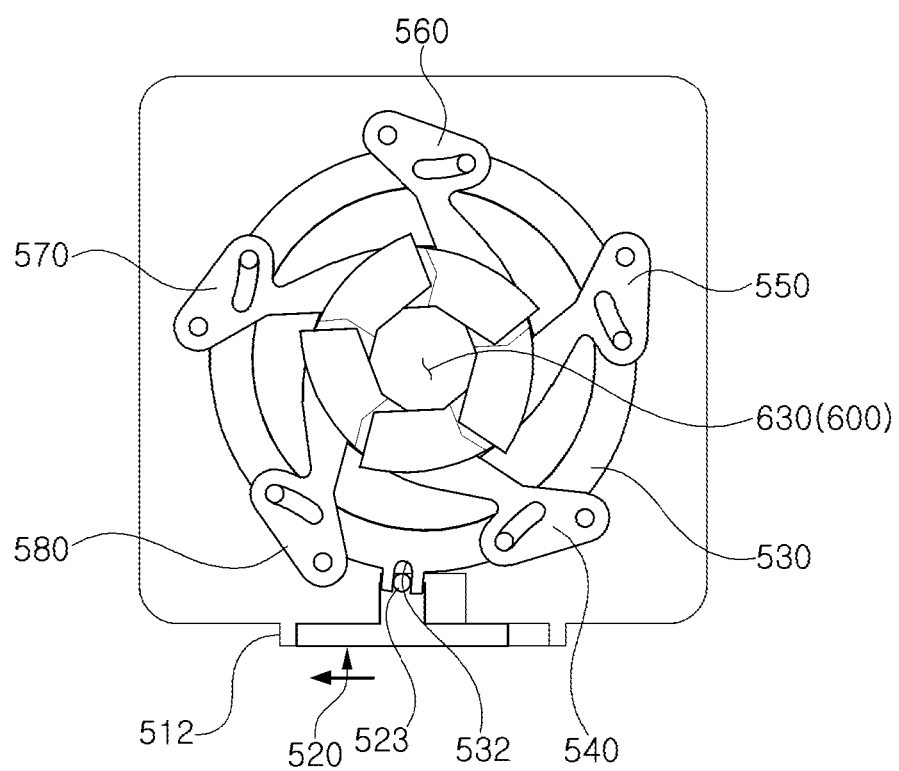

For example, FIGS. 10A to 10C illustrate an embodiment of an aperture module in which five blades are included, and thus a size of an entrance hole is changed, and the plurality of blades 540, 550, 560, and 570 include a blade 580.

Figure 6A:
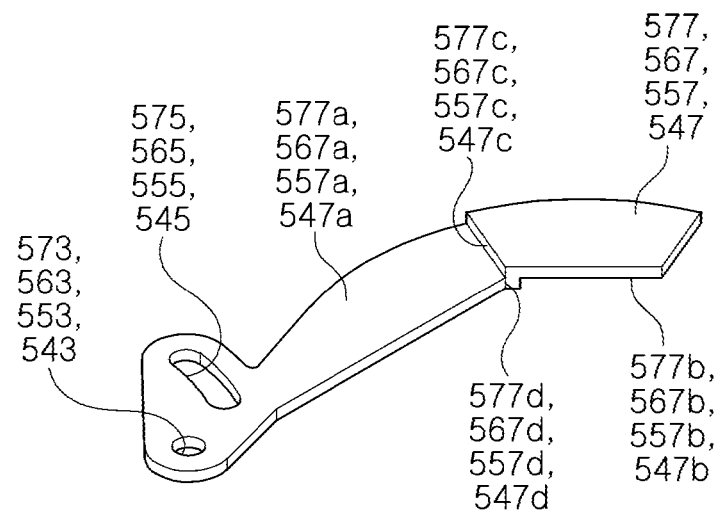
FIGS. 6A and 6B illustrate one or more examples of a blade of an aperture module according to an embodiment of the present disclosure.
Figure 6B:
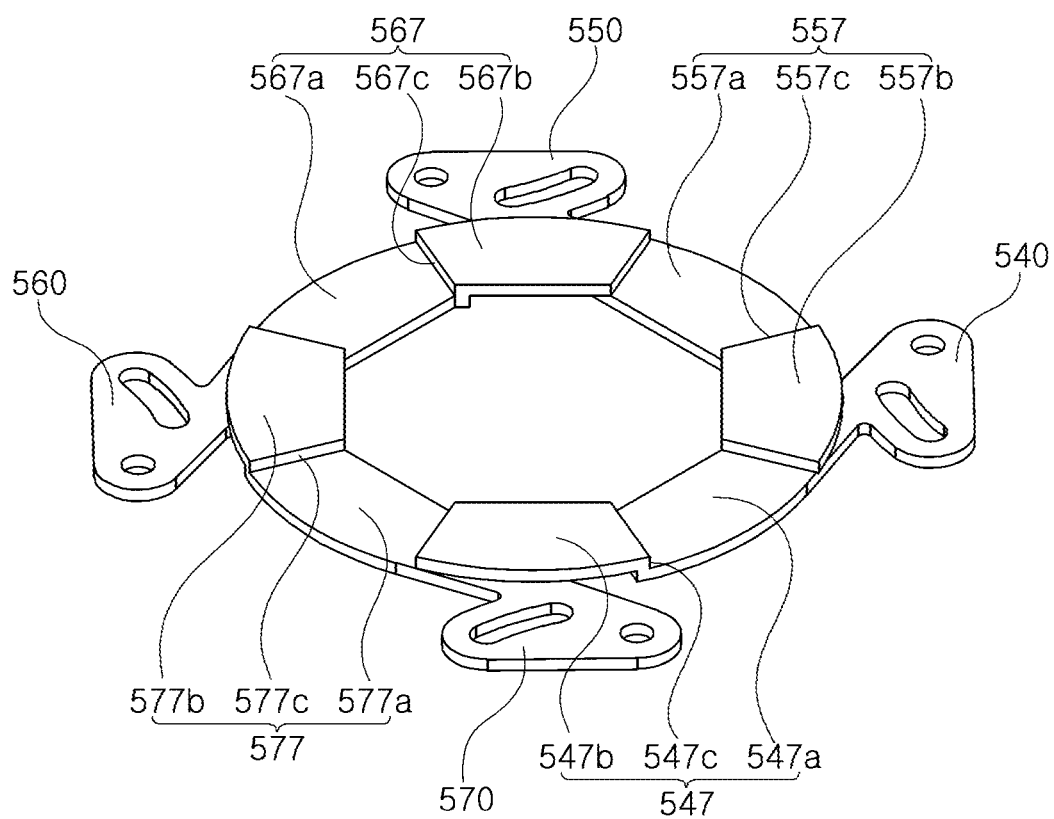
Figure 7A:
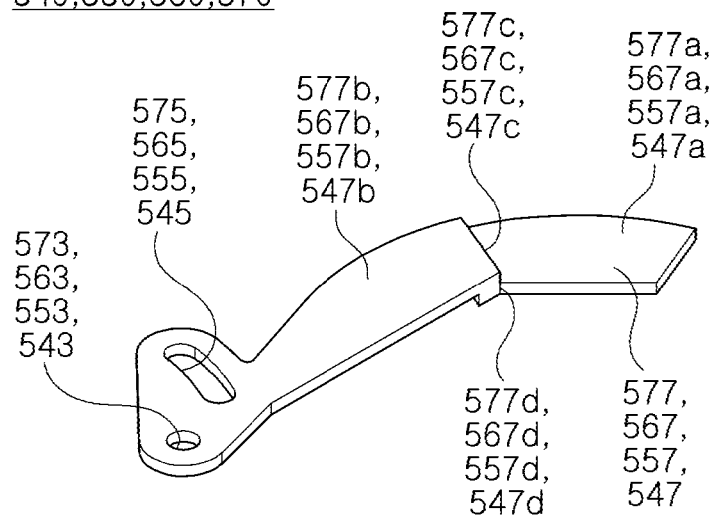
FIGS. 7A and 7B illustrate one or more examples of a blade of an aperture module according to another embodiment of the present disclosure.
Figure 7B:
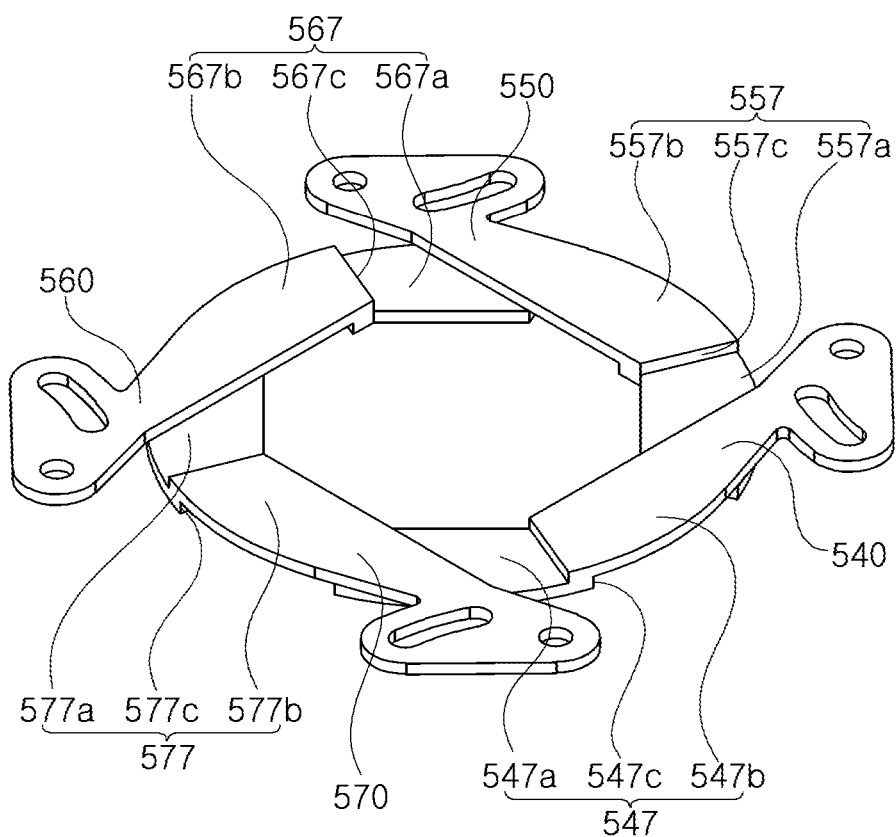

Referring to FIGS. 6A and 6B, which illustrate one or more examples of a blade of an aperture module according to an embodiment and FIGS. 7A and 7B, which illustrate one or more examples of a blade of an aperture module according to another embodiment, the first to fourth blades 540, 550, 560, and 570 are provided to have a substantially boomerang shape, concave portions of the first to fourth blades 540, 550, 560, and 570 are disposed toward an optical axis, and thus a plurality of blades may form an entrance hole having a polygonal or regular polygonal shape.

In an embodiment, the first to fourth blades 540, 550, 560, and 570 may have an inner side portion having bent portions 547c, 557c, 567c, and 577c in which wing portions 547, 557, 567, and 577, forming an entrance hole, are bent in a 'V' shape, and may include upper blades 547a, 557a, 567a, and 577a as well as lower blades 547b, 557b, 567b, and 577b, which are provided to be stepped with each other on the basis of the stepped portions 547d, 557d, 567d, and 577d in a direction of an optical axis (see FIG. 6A or FIG. 7A).

In addition, the stepped portions 547d, 557d, 567d, and 577d may be formed by substantially a thickness of a blade. In other words, the upper blades 547a, 557a, 567a, and 577a and the lower blades 547b, 557b, 567b, and 577b may be spaced apart from each other in a direction of an optical axis by a thickness of the stepped portions 547d, 557d, 567d, and 577d. In this regard, when the stepped portions 547d, 557d, 567d, and 577d are formed by substantially a thickness of a blade, adjacent blades are disposed to easily overlap each other.

In the plurality of blades 540, 550, 560, and 570, the upper blades 547a, 557a, 567a, and 577a, disposed in an upper portion in a direction of an optical axis, are provided a side provided with rotating shaft holes 543, 553, 563, and 573, while the lower blades 547b, 557b, 567b, and 577b are provided on an opposite side thereof (see FIGS. 6A and 6B).

Moreover, in the plurality of blades 540, 550, 560, and 570 according to another embodiment, the upper blades 547a, 557a, 567a, and 577a, disposed in an upper portion in a direction of an optical axis, are provided away from the rotating shaft holes 543, 553, 563, and 573, while the lower blades 547b, 557b, 567b, and 577b are provided close to the rotating shaft holes 543, 553, 563, and 573 (see FIGS. 7A and 7B).

An entrance hole, formed by overlapping the first to fourth blades 540, 550, 560, and 570, may have an octagonal or regular octagonal shape.

Moreover, the first to fourth blades 540, 550, 560, and 570 are provided to be stepped, and thus may be provided to overlap each other in the same position in a direction of an optical axis. In other words, the first to fourth blades 540, 550, 560, and 570 are provided to be stepped in two stages of an upper blade and a lower blade, and the upper blade may be disposed to overlap an upper portion of the lower blade in a direction of an optical axis, in the first to fourth blades 540, 550, 560, and 570, of an adjacent blade of the first to fourth blades 540, 550, 560, and 570. Accordingly, even when a plurality of blades are provided, only a space in a direction of an optical axis is occupied by twice a thickness of a blade, and thus a thickness of an aperture module may be reduced, and the space utilization may be increased.

The first to fourth blades 540, 550, 560, and 570 may be provided with stepped portions 547d, 557d, 567d, and 577d in a position in which the bent portions 547c, 557c, 567c, and 577c are provided.

In addition, each of the blades 540, 550, 560, and 570 may provide two sides for formation of an entrance hole having a polygonal shape. Accordingly, a shape of an entrance hole may have a polygonal shape having a number of sides corresponding to twice the number of blades.

Moreover, each of the blades 540, 550, 560, and 570 is provided in two stages of an upper blade and a lower blade, and the upper blade and the lower blade overlap each other in adjacent blades. In this regard, the stepped portions 547d, 557d, 567d, and 577d, provided in each blade, may serve as a stopper by which a blade adjacent in formation of the smallest entrance hole is caught to limit an amount of rotation of a blade (see FIG. 8C).

The first to fourth blades 540, 550, 560, and 570 are slid while a portion of the first to fourth blades is in contact to each other, so antistatic processing may be performed so as not to generate frictional electricity.

The first to fourth blades 540, 550, 560, and 570 may be interlocked with the rotary plate 530 to be driven. However, this is only an example, and the drawings thereof are omitted, but the first to fourth blades 540, 550, 560, and 570 may be directly connected to a moving portion 520, a driving unit, to be driven. To sum up, the first to fourth blades 540, 550, 560, and 570 may be directly interlocked with the moving portion 520, a driving unit, or indirectly interlocked with the moving portion through the medium of the rotary plate 530.

The rotary plate 530 is interlocked with the moving portion 520, linearly reciprocating in a direction perpendicular to an optical axis direction, and converts a linear motion of the moving portion 520 into rotatory motion to perform rotatory motion substantially around an optical axis.

The through-hole 531 is provided at the center of the rotary plate 530 to allow light to pass therethrough, and the through-hole 531 may have a same, greater, or less size, as compared with an entrance hole having a maximum size, formed by the first to fourth blades 540, 550, 560, and 570. Moreover, the rotary plate 530 is in contact with the first to fourth blades 540, 550, 560, and 570, so antistatic processing may be performed so as not to generate frictional electricity.

Accordingly, a guide groove 511 for guiding rotation motion of the rotary plate 530 may be provided in the base 510, and the rotary plate 530 is inserted into the guide groove 511 to be guided so as to rotate. The rotary plate 530 may have an edge with a rounded shape. Here, the guide groove 511 may also have an edge with a rounded shape to correspond to the rotary plate 530.

Figure 9:
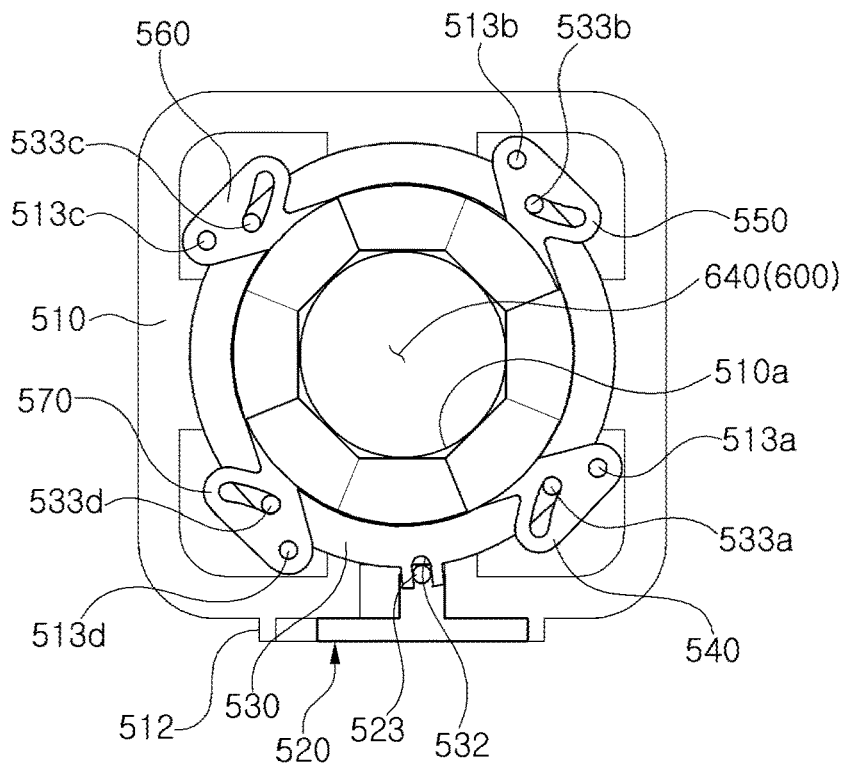
FIG. 9 is a plan view illustrating one or more examples of a maximum size entrance hole of an aperture module according to another embodiment of the present disclosure.

In addition, a through-hole 510a is provided in the base 510, and the through-hole 510a may have a same, greater, or less size, as compared with an entrance hole having a maximum size, formed by the first to fourth blades 540, 550, 560, and 570. In detail, when the through-hole 510a has a smaller size than an entrance hole having a maximum size, formed by the first to fourth blades 540, 550, 560, and 570, entrance holes 640 and 600 provided with the largest through-hole 510a may be implemented (see FIG. 9).

The first to fourth blades 540, 550, 560, and 570 may be interlocked with the rotary plate 530, being rotating, to be driven.

The first to fourth blades 540, 550, 560, and 570 include rotating shaft holes 543, 553, 563, and 573 as well as driving shaft holes 545, 555, 565, and 575, respectively, the rotating shaft holes 543, 553, 563, and 573 are inserted onto the fixing shafts 513a, 513b, 513c, and 513d, provided in the base 510, to be rotated, respectively, and the driving shaft holes 545, 555, 565, and 575 are disposed on driving shafts 533a, 533b, 533c, and 533d to allow the driving shafts 533a, 533b, 533c, and 533d of the rotary plate 530 to rotate and move.

Hereinafter, the rotating shaft holes 543, 553, 563, and 573, the driving shaft holes 545, 555, 565, and 575, and a guide hole 532 are provided to form a rotating shaft or to transmit power by inserting fixing shafts 513a, 513b, 513c, and 513d, driving shafts 533a, 533b, 533c, and 533d, and a driving projection 523 thereinto. A configuration name thereof is referred to as including a 'hole' for convenience, but it may have a hole shape, groove shape, or the like.

The rotating shaft holes 543, 553, 563, and 573 of the first to fourth blades 540, 550, 560, and 570 may have a round shape, and may only be rotated while being inserted on the fixing shafts 513a, 513b, 513c, 513d.

In addition, the driving shaft holes 545, 555, 565, and 575 are elongated, and the driving shafts 533a, 533b, 533c, and 533d may move while the driving shafts 533a, 533b, 533c, and 533d are inserted into the driving shaft holes 545, 555, 565, and 575. The driving shaft holes 545, 555, 565, and 575 may be inclined in a rotation direction of the rotary plate 530. Accordingly, while the driving shafts 533a, 533b, 533c, and 533d move along the driving shaft holes 545, 555, 565, and 575 according to rotation of the rotary plate 530, the first to fourth blades 540, 550, 560, and 570 may be allowed to be rotated so as to be closed or spread.

As a result, when the moving portion 520 moves from an end portion of one side to an end portion of the other side, the rotary plate 530 rotates continuously. Accordingly, the first to fourth blades 540, 550, 560, and 570, connected to the rotary plate 530, may rotate while the driving shafts 533a, 533b, 533c, and 533d move. Accordingly, while the first to fourth blades 540, 550, 560, and 570 are closed inwardly or spread outwardly, the entrance hole 600 having various sizes may be implemented in a multistage or continuously.

In an embodiment, the first to fourth blades 540, 550, 560, and 570 are interlocked with the rotary plate 530. Moreover, when the moving portion 520 linearly moves due to an electromagnetic effect between the driving magnet 521a and the driving coil 521b, the rotary plate 530 interlocked with the same also rotates. Accordingly, the first to fourth blades 540, 550, 560, and 570 also move, so a diameter of an aperture can be changed.

The fixing shafts 513a, 513b, 513c, and 513d of the base 510 are provided to correspond to the number of the blades 540, 550, 560, and 570, and may be arranged to form a regular polygonal shape when the fixing shafts 513a, 513b, 513c, and 513d are sequentially connected to each other. For example, sequentially connected to each other refers to a closed path where the fixing shafts 513a, 513b, 513c, and 513d are sequentially connected to each other and the last fixing shaft 513d is also connected to the first fixing shaft 513a. That is, the fixing shafts 513a, 513b, 513c, and 513d may be provided at equal intervals along a circumference of a predetermined circle. As in an embodiment, when four blades are provided, the fixing shafts 513a, 513b, 513c, and 513d are sequentially connected to form a square.

For example, the first to fourth blades 540, 550, 560, and 570 may be arranged in a circumferential direction to form an entrance hole. Moreover, while the first to fourth blades 540, 550, 560, and 570 are closed inwardly or spread outwardly, the entrance hole 600 having various sizes may be implemented continuously. For example, an entrance hole may have a round shape or a polygonal shape or a shape with a circumference in which a straight line and a curved line are mixed according to a shape of an inner circumferential surface of the first to fourth blades 540, 550, 560, and 570. In addition, all the plurality of blades 540, 550, 560, and 570 may have the same shape.

Thus, depending on the image-capturing environment, light may be incident through one incident hole of incident holes having various sizes.

An aperture driving unit is disposed in the base 510 so as to be movable along an axis, and includes a moving portion 520 having a magnet 521a and a driving coil 521b fixed to the housing 110 to oppose the magnet 521a.

The driving coil 521b is provided in the substrate 900, and the substrate 900 is fixed to the housing 110. The substrate 900 may be electrically connected to a printed circuit board attached to a bottom of the camera module 1000.

The moving portion 520 is provided with a moving member moving in an optical axis direction, a first direction, and a second direction together with the base 510, the driving coil 521b is provided as a fixed member fixed to the housing 110.

Since the driving coil 521b, providing driving force to the aperture module 500, is disposed outside the aperture module 500, that is, in the housing 110 of a camera module, weight of the aperture module 500 may be reduced.

In other words, since the driving coil 521b providing driving force to the aperture module 500 is provided as a fixed member, a coil does not move during the autofocus adjustment or the hand-shake compensation operation is performed. Accordingly, an increase in a weight of the lens module 200 caused by an application of the aperture module 500 may be significantly reduced.

Moreover, the driving coil 521b, providing driving force to the aperture module 500, is disposed in the housing 110, a fixed member, and is then electrically connected to a printed circuit board. Thus, even when the lens module 200 and the aperture module 500 move during the focus adjustment and the shaking compensation, the coil 521b of the aperture driving unit may not be affected.

Thus, an autofocusing adjustment function can be prevented from being degraded.

Moreover, in an embodiment, since a size of the entrance hole 600 of an aperture can be successively changed, it is required that a position of the moving portion 520 is accurately sensed in order to accurately implement a size of an entrance hole. In this regard, in an embodiment, a position sensor 521c disposed to oppose the driving magnet 521a of the moving portion 520 to determine a position of the driving magnet 521a may be included. The position sensor 521c may be provided as a hall sensor, and may be installed at the center of the driving coil 521b fixed to the housing 110 or adjacent to the driving coil 521b fixed to the housing 110. For example, the position sensor 521c may be provided in the substrate 900 with the driving coil 521b provided therein.

In an embodiment, when the moving portion 520 is allowed to move linearly, a closed-loop control method in feedback is provided by detecting a position of the moving portion 520 and using the detected position. Thus, the position sensor 521c may be used for the closed-loop control. In an example, a controller may implement the closed-loop control method.

Moreover, in the substrate 900, a Gyro sensor (not illustrated) detecting a shaking factor such as hand-shake of a user, or the like, and a driving circuit element, for example, a driver integrated circuit (IC) (not illustrated), providing a driving signal to the plurality of coils 810b, 830b, 730, and 521b, may be provided.

A moving guide 512 with the moving portion 520 disposed therein may be provided in the base 510. The moving guide 512 may have a shape extended from the base 510 in an optical axis direction.

The moving portion 520 includes a driving magnet 521a disposed to oppose the driving coil 521b and a magnet holder 522 to which the driving magnet 521a is coupled. The driving magnet 521a is provided to oppose the driving coil 521b in a direction perpendicular to an optical axis direction.

The moving portion 520 moves while being in close contact with the moving guide 512 of the base 510. Accordingly, a yoke 515 may be provided in the moving guide 512 to allow the moving portion 520 to be in close contact with the moving guide 512 due to an attractive force with the driving magnet 521a of the moving portion 520. For example, a yoke 225 of the lens module may be provided in a position opposing the moving portion 520 of the lens module 200. Due to the attractive force between the yokes 515 and 225 and the driving magnet 521a, the moving portion 520 may slidably move while being in close contact with the moving guide 512.

When power is not applied to the driving coil 521b, the aperture module 500, according to an embodiment, may allow the moving portion 520 to move to a predetermined position to be fixed thereto.

A bearing may be provided in the base 510 to allow sliding movement of the moving portion 520 to be easily performed. For example, as illustrated in FIG. 5, a ball bearing 516 may be provided between the moving portion 520 and the moving guide 512, and seating grooves 516a and 516b, on which the ball bearing 516 is seated, may be selectively provided in the moving portion 520 and the moving guide 512. Here, the bearing is not limited to the ball bearing. For example, the bearing may have a rod or plate shape allowing sliding movement to be easily performed.

When power is applied to the driving coil 521b, the moving portion 520 may move in a direction perpendicular to an optical axis direction due to an electromagnetic influence between the driving magnet 521a and the driving coil 521b.

A guide groove 511 for guiding rotation motion of the rotary plate 530 is provided in the base 510, and the rotary plate 530 is inserted into the guide groove 511 to be guided so as to rotate.

In addition, a guide hole 532 formed to be elongated in a direction may be provided in the rotary plate 530. The guide hole 532 may be provided to be long and inclined in a moving direction of the moving portion 520. The guide hole 532 may have a hole or groove shape. For reference, in the drawings, the guide hole 532 is illustrated as having a groove shape with an open one side.

Figure 8A:
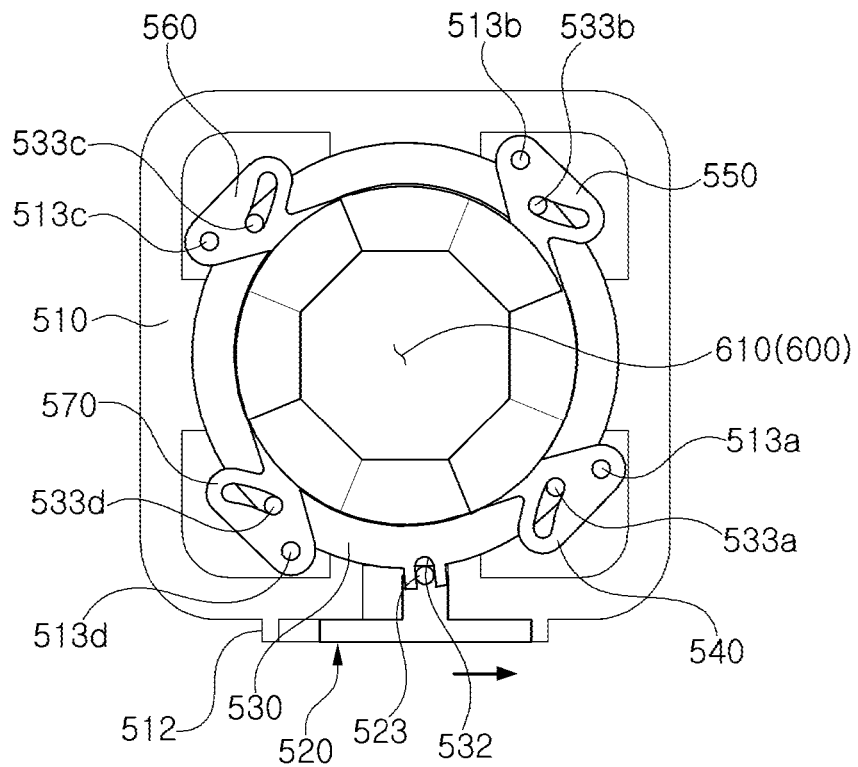
FIGS. 8A, 8B, and 8C are plan views illustrating one or more examples of an aperture module driven for a change in a size of an entrance hole of an aperture module according to an embodiment of the present disclosure.
Figure 8B:
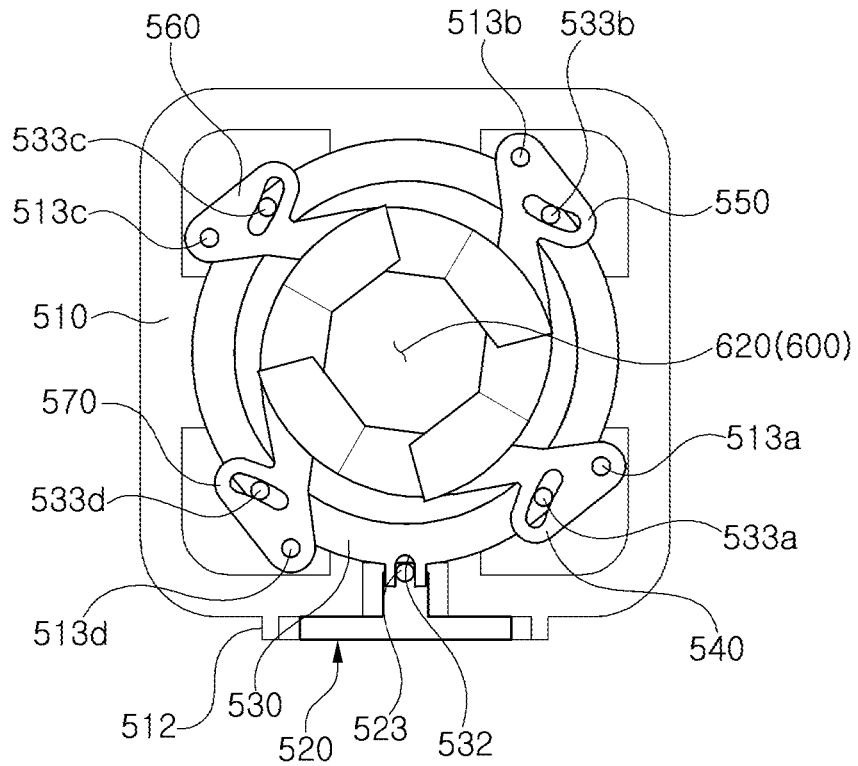
Figure 8C:
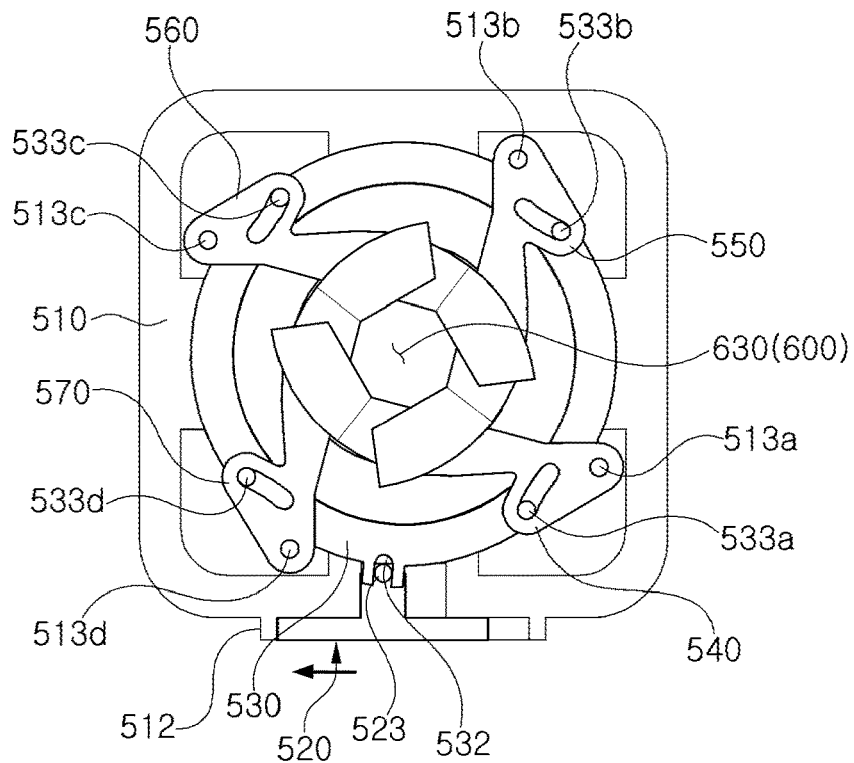

Thus, when the moving portion 520 moves along an axis, the driving projection 523, provided in the moving portion 520, may move in the guide hole 532, the rotary plate 530 rotates inside the guide groove 511 according to movement of the driving projection 523, and a size of the entrance hole 600 may be changed in a multistage or continuously while the first to fourth blades 540, 550, 560, and 570, interlocked with the rotary plate 530, are closed or spread (see FIGS. 8A to 8C).

FIGS. 8A to 8C are plan views illustrating one or more examples of an aperture module driven while a size of an entrance hole is changed in a multi-stage or successively.

Referring to FIG. 8A, when the moving portion 520 is provided in an end of one side, for example, in an end of one side of the moving guide 512, entrance holes 610 and 600 having the largest size may be implemented due to the first to fourth blades 540, 550, 560, and 570.

In addition, referring to FIG. 8B, when the moving portion 520 is moved from the end of the one side to the other side by a predetermined distance, for example moved to an approximately intermediate position, the first to fourth blades 540, 550, 560, and 570 rotate, so entrance holes 620 and 600 having a medium size may be implemented.

Moreover, referring to FIG. 8C, when the moving portion 520 is moved to an end of the other side, opposite to the one side, by driving an aperture driving unit, the first to fourth blades 540, 550, 560, and 570 rotate, so entrance holes 630 and 600 having the smallest size may be implemented.

As described above with reference to FIGS. 8A to 8C, when the moving portion 520 moves from the end of the one side to the end of the other side direction, and then returns to the end of the one side again, due to the first to fourth blades 540, 550, 560, and 570, a size may be changed from entrance holes 630 and 600 having the smallest size to entrance holes 610 and 600 having the largest size.

In addition, when the moving portion 520 moves between the end of the one side and the end of the other side by driving the aperture driving unit, an entrance hole 620 having any size between an entrance hole 610 having a largest size and an entrance hole 630 having a smallest size may be implemented in various ways due to the first to fourth blades 540, 550, 560, and 570.

As described above, the aperture module 500 according to an embodiment may allow entrance holes having various sizes to be implemented successively by a linear reciprocating motion of the moving portion 520.

According to the examples described above, in a camera module according to an embodiment of the present disclosure, an incident amount of light may be selectively changed through an aperture module. Moreover, when an aperture module is mounted, an autofocusing adjustment function may be prevented from being degraded, and an increase in weight caused by an application of an aperture module may be significantly reduced.

According to the examples described above, an aperture module may be provided, and the aperture module may be capable of implementing a diameter of an aperture successively and accurately, while reducing the use of a current.

Moreover, according to the examples described above, while a plurality of blades are used to form an entrance hole having a shape similar to a circular shape, a thickness of an aperture module may not be increased.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module, comprising:
   a base;
   a plurality of blades forming an entrance hole having various sizes by combinations thereof; and
   a driving unit driving the plurality of blades,
   wherein the plurality of blades each comprises a step portion in both an upper surface and a lower surface.

2. The aperture module of claim 1, wherein the plurality of blades overlap each other in a same position in a direction of an optical axis.

3. The aperture module of claim 1, wherein the plurality of blades are stepped in two stages.

4. The aperture module of claim 3, wherein the plurality of blades are each stepped by a blade thickness in a direction of an optical axis.

5. The aperture module of claim 3, wherein the two stages comprise an upper blade and a lower blade, and wherein the upper blade of each blade is disposed to overlap an upper portion of the lower blade in an optical axis direction of an adjacent blade of the plurality of blades.

6. The aperture module of claim 3, wherein the two stages comprise an upper blade and a lower blade, and
a boundary between the upper blade and the lower blade comprises a bent portion.

7. The aperture module of claim 6, wherein the entrance hole comprises a polygonal shape, and each of the plurality of blades provides two sides in which both sides form the entrance hole based on the bent portion.

8. The aperture module of claim 3, wherein the plurality of blades comprise a stepped portion in a boundary between the two stages, and
wherein the stepped portion is caught by an adjacent blade of the plurality of blades to serve as a stopper.

9. The aperture module of claim 1, wherein the entrance hole is a regular polygon.

10. The aperture module of claim 9, wherein each of the plurality of blades provides two sides to the entrance hole in the form of a regular polygon.

11. The aperture module of claim 1, wherein a through-hole of the base is exposed to form a largest entrance hole when the plurality of blades are extended outwardly.

12. The aperture module of claim 1, wherein the plurality of blades comprise the same shape.

13. The aperture module of claim 1, wherein a size of the entrance hole is changed continuously.

14. The aperture module of claim 1, wherein the plurality of blades each comprise a blade thickness and are disposed to overlap each other to be implemented to have a thickness twice the blade thickness.

15. A camera module, comprising:
an aperture module disposed on a lens module, and forming an entrance hole having various sizes using a plurality of blades; and
an aperture driving unit configured to move by connecting a moving portion, comprising a driving magnet opposing a driving coil, to the plurality of blades,
wherein the plurality of blades are disposed in a same position in an optical axis direction, and
wherein the plurality of blades each comprises a step portion in both an upper surface and a lower surface.

16. The camera module of claim 15, wherein the plurality of blades are stepped in two stages and each blade is disposed to overlap an adjacent blade.

17. An aperture module, comprising:
a rotary plate disposed on a base;
an aperture driving unit driving rotation of the rotary plate; and
three or more blades connected to the base and the rotary plate to increase and decrease an entrance hole size in response to the rotation, wherein each of the three or more blades comprises a portion forming the entrance hole,
wherein the three or more blades each comprise an upper blade and a lower blade stepped from the upper blade,
wherein the upper blade of each blade overlaps in an optical axis direction an upper surface of a lower blade of an adjacent blade of the three or more blades, and
wherein both an upper surface and a lower surface of each of the three or more blades comprise a step.

18. The aperture module of claim 17, wherein the three or more blades are each disposed on the base and the rotary plate on a same plane perpendicular to the optical axis.

19. The aperture module of claim 18, wherein the three or more blades overlap in the optical axis direction to a height substantially the same as a height from a lower surface of the lower blade to an upper surface of the upper blade of the three or more blades.

20. The aperture module of claim 17, wherein the three or more blades are each stepped by a blade thickness in the optical axis direction.

21. An aperture module, comprising:
a rotary plate disposed on a base;
an aperture driving unit driving the rotary plate to rotate; and
a plurality of blades interlocked with rotation of the rotary plate, and forming an entrance hole having various sizes by combinations thereof,
wherein the plurality of blades each comprise a portion forming the entrance hole in a stepped form,
wherein the plurality of blades are stepped in two stages,
wherein the two stages comprise an upper blade and a lower blade, and a boundary between the upper blade and the lower blade comprises a bent portion.

22. The aperture module of claim 21, wherein the entrance hole comprises a polygonal shape, and each of the plurality of blades provides two sides in which both sides form the entrance hole based on the bent portion.

* * * * *